United States Patent [19]

Hatabe et al.

[11] Patent Number: 5,077,606
[45] Date of Patent: Dec. 31, 1991

[54] COLOR SIGNAL EMPHASIZING/DE-EMPHASIZING CIRCUIT

[75] Inventors: Etsuo Hatabe, Kamakura; Susumu Tokumaru, Fukuyama, both of Japan

[73] Assignee: Mitsubushi Senki Kabushiki Kaisha, Tokyo, Japan

[21] Appl. No.: 519,454

[22] Filed: May 4, 1990

[30] Foreign Application Priority Data

May 8, 1989 [JP] Japan .................................. 1-114696

[51] Int. Cl.⁵ ................................................ G03F 3/00
[52] U.S. Cl. ......................................... 358/75; 358/80; 358/455
[58] Field of Search ....................... 358/27, 28, 75, 80, 358/455, 461

[56] References Cited

U.S. PATENT DOCUMENTS

| | | | |
|---|---|---|---|
| 4,314,274 | 2/1982 | Atoji et al. ............................ | 358/80 |
| 4,335,398 | 6/1982 | Yamada ................................ | 358/80 |
| 4,631,578 | 12/1986 | Sasaki .................................... | 358/80 |
| 4,649,423 | 3/1987 | Hoffrichter et al. .................. | 358/80 |
| 4,953,008 | 8/1990 | Kaye ..................................... | 358/27 |

Primary Examiner—Leo H. Boudreau
Assistant Examiner—Steven D. Fallon

[57] ABSTRACT

A color signal emphasizing/de-emphasizing method and apparatus are for outputting image data scanned from the target image in every pixel on a color print or a color display by means of three principle color signals. This method and apparatus are intended to obtain a desired hue variation or color saturation by emphasizing/de-emphasizing one of the three principle color signals. The three principle colors are classified into a primary color portion signal, a secondary color portion signal and tertiary color portion signal. These designated signals of color portions are respectively multiplied by color coefficients predetermined for each designated signal. Finally, a corrected color signal is obtained by summing up these multiplied signals in every principle color.

8 Claims, 5 Drawing Sheets

COLOR SIGNAL EMPHASIZING/DE-EMPHASIZING CIRCUIT

BACKGROUND OF THE INVENTION

1. Field of the Invention

This invention relates to a color signal emphasizing/de-emphasizing circuit for a color printer or a color video display. More particularly it relates to a color signal emphasizing/de-emphasizing circuit capable of reproducing the original colors of the target image with high fidelity by correcting a hue or saturation thereof or to a circuit capable of changing only the specified color without exerting any influence on other colors.

2. Description of the Related Arts

According to the conventional color signal correction circuit, it is possible to produce an output of the target image on a CRT or on a paper whenever it is necessary. This is interpreted as an electrical signal by a TV camera or an image scanner. It is further stored in the form of electric data such as the image information.

Although a pixel, or a picture element, of the target image is generally interpreted as brightness information in the existing image processing using a black-and-white signal, in the case of a color image processing, each pixel is interpreted as the three principle color signals.

As is well known, the three principle colors consist of yellow (Y), magenta (M) and cyan (C) in the printing color principle while they consist of red (R), green (G) and blue (B) in the optical color principle employed in the display such as a CRT.

The present invention relates to the color signal emphasizing/de-emphasizing method and apparatus capable of emphasizing or de-emphasizing any desired color when producing an output of an image on a paper or a display based on the three principle colors obtained by scanning the target in every pixel.

To reproduce the colors scanned in every pixel on a paper of a printer or on a CRT with high fidelity, for example in the case of a sublimation type printer, it is necessary to correct the color saturation included in a sublimation type ink. To this end, a color masking method employing the equation 1 as shown below has been used as a signal converting method to obtain Yo, Mo, Co signals required to eliminate color saturation errors from Yi, Mi, Ci signals input to the printer. The equation is expressed as;

$$\begin{pmatrix} Co \\ Mo \\ Yo \end{pmatrix} = aij \begin{pmatrix} Ci \\ Mi \\ Yi \end{pmatrix} \quad (1)$$

where Ci, Mi, Yi denote the original signals and Co, Mo, Yo the emphasized/de-emphasized signals. Moreover, the "aij" ($1 \leq i \leq 3$, $1 \leq j \leq 3$) is an emphasizing/de-emphasizing coefficient and is used to enable an exact color reproduction by correcting the color saturation of ink, which may differ in accordance with the characteristic of the input YMC signals or a printer.

Figure 5:
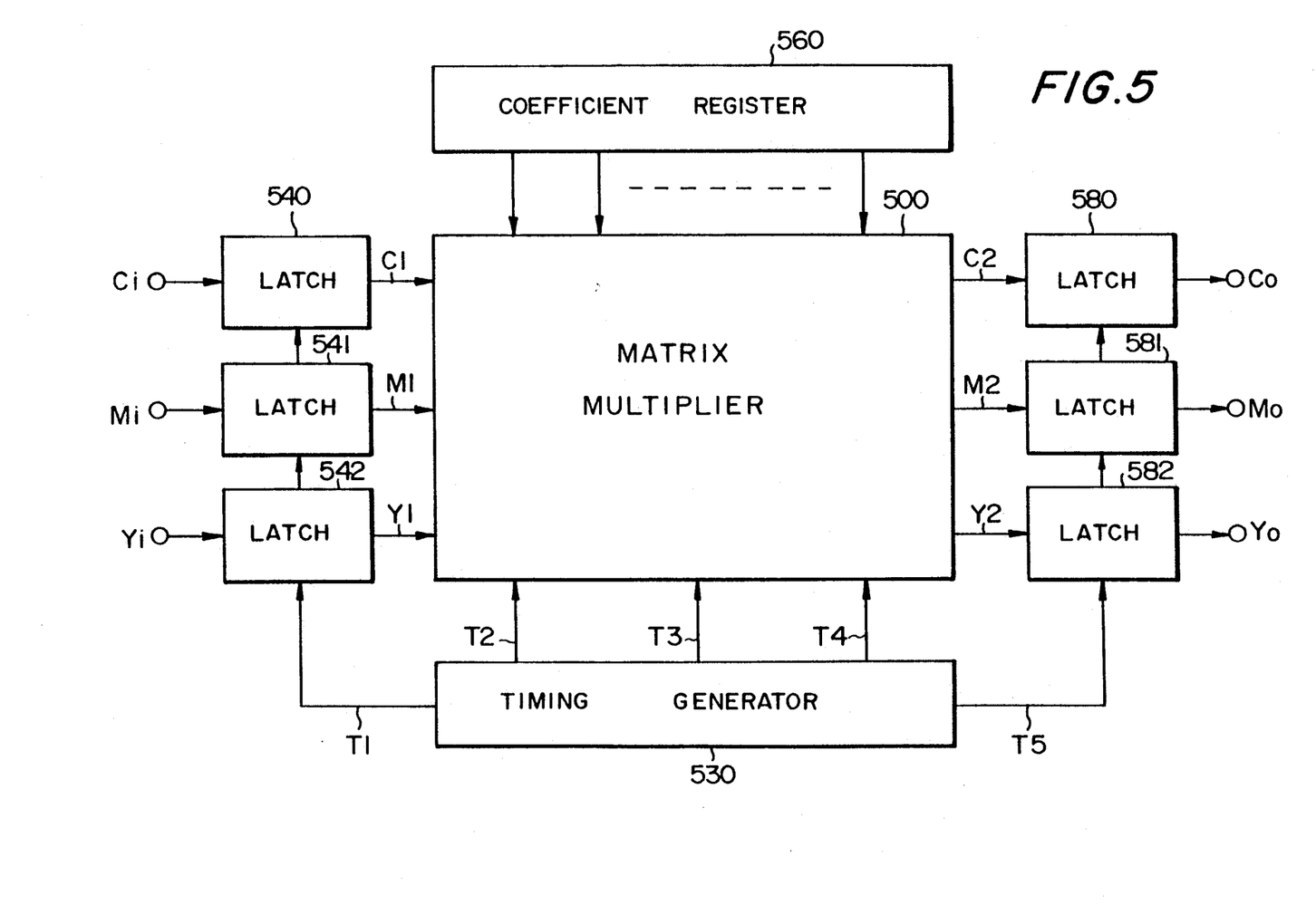
FIG. 5 is a block diagram showing a conventional color signal correction circuit.
Figure 6:
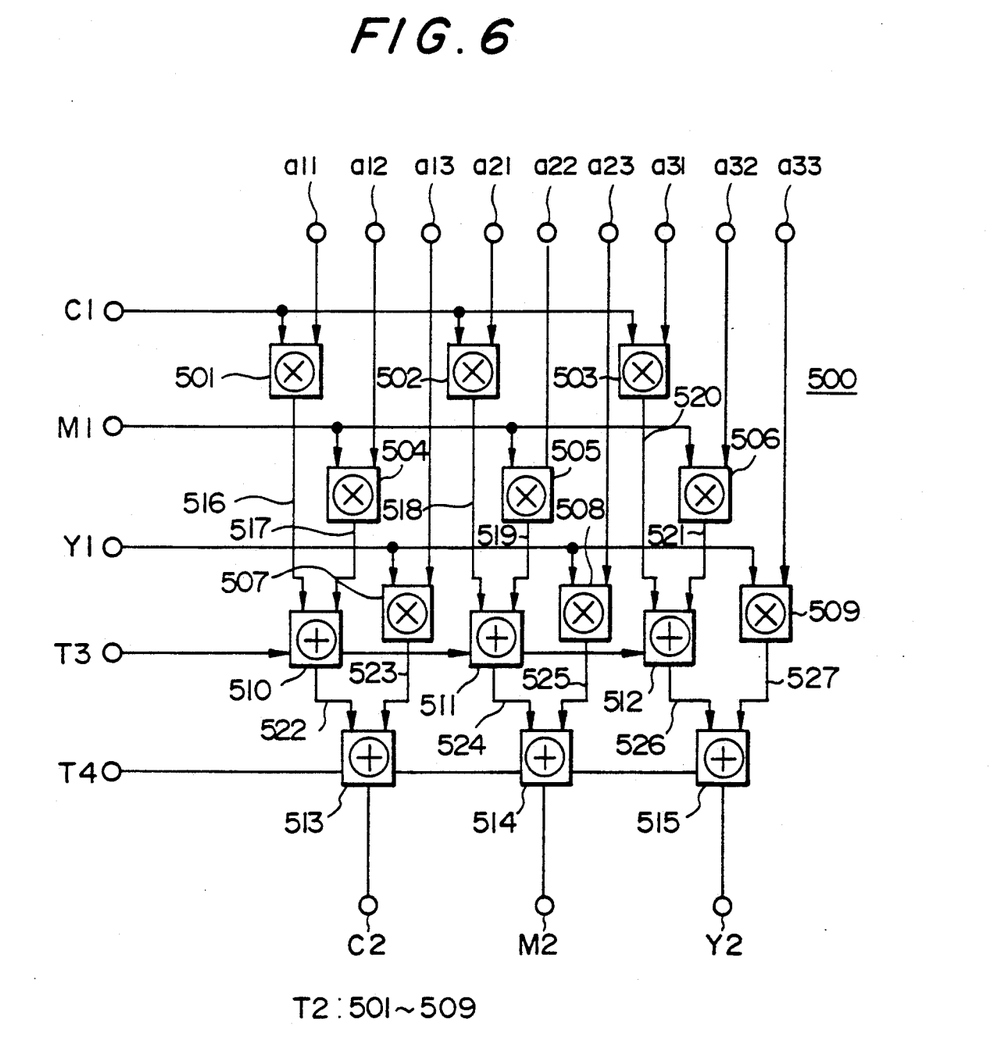
FIG. 6 is a block diagram showing a detail of the matrix multiplier shown in FIG. 5.

FIG. 5 is a block diagram showing an existing color signal correction circuit to realize the color masking method disclosed in the Japanese Patent Laid Open No. 27262/1988 in which a matrix multiplier 500 is used to obtain the result of the equation 1. In FIG. 5, the original color signals Ci, Mi and Yi are respectively held in latches 540, 541 and 542 according to a signal T1 generated in a timing generator 530 to be delivered to the matrix multiplier 500 as the color signals C1, M1 and Y1. The emphasizing/de-emphasizing coefficient aij ($1 \leq i \leq 3$, $1 \leq j \leq 3$) is given to the matrix multiplier 500 from a coefficient register 560. FIG. 6 is a block diagram showing a detail of the matrix multiplier 500 shown in FIG. 5. The input color signals C1, M1 and Y1 are respectively fed into multipliers 501 through 503, 504 through 506, and 507 through 509. Further, a signal T2 generated in the timing generator 530 is delivered to all multipliers 501 through 509. In the multipliers 501, 504 and 507, the input color signals C1, M1 and Y1 are independently multiplied by the coefficients a11, a12 and a13 output from the coefficient register 560 shown in FIG. 5 according to the signal T2. The multiplied signals are then delivered as inputs of 516, 517 to an adder 510 and as an input of 523 to an adder 513. The adder 510 functions according to a signal T3 generated in the timing generator 530 to produce an input 522 of the adder 513. Besides, the adder 513 functions according to a signal T4 generated in the timing generator 530 to produce an output color signal C2. In the same manner, it is possible to obtain not only an output color signal Y2 by the multipliers 503, 506, 509, adders 512, 515 and inputs of 520, 521, 526, 527 but an output color signal M2 by the multipliers 502, 505, 508, adders 511, 514 and inputs of 518, 519, 524, 525 at the same time. The output color signals C2, M2 and Y2 obtained in the manner as described above are respectively held in latches 580, 581 and 582 according to a signal T5 generated in the timing generator 530 shown in FIG. 5 to be output as emphasizing/de-emphasizing signals Co, Mo, Yo.

According to the existing color signal correction circuit employing the color masking method, a color matching of a printer is performed by changing the emphasizing/de-emphasizing coefficient "aij" if a slight variation of the characteristic of the original signals Ci, Mi, Yi or the color saturation included in ink of a printer occurs. However, it is quite difficult to foresee what kind of color will be reproduced when the emphasizing/de-emphasizing coefficient "aij" is adjusted by the coefficient register 560 shown in FIG. 5. Another problem of the conventional circuit is that since a hue of the entire printed color changes when the emphasizing/de-emphasizing coefficient "aij" is adjusted, it is impossible to slightly change only a color specified, for example to change a color of flowers to make them more reddish, without exerting any influence on the other colors to be printed on a paper or to be displayed on a CRT. A further problem of the prior color signal correction circuit is that cost of the apparatus increases because it requires a number of such complex multipliers as shown in FIG. 6.

To solve the above described problems, the present invention provides a low cost color signal emphasizing/de-emphasizing circuit which is capable of eliminating color saturation errors included in ink of a color printer and of reproducing the original colors of the target image with high fidelity and of slightly changing only a color specified without exerting any influence on the other colors to be printed on a paper.

As is generally known, all colors printed on a color printer or displayed on a color display are based on a combination of the three primary-colors principle, that is yellow (Y), magenta (M) and cyan (C) in the printing color principle, and red (R), green (G) and blue (B) in the optical color principle. In the present invention, as the terms expressing a combination of these three principle colors, there are used terms of a primary color which is a single one of any principle color, a secondary color which has a combination of two principle colors, and a tertiary color which has a combination of the three principle colors. For example, a primary color depicts a color in which one of the three principle colors, i.e. Y, M and C exists solely; a secondary color is a color in which two of the three principle colors are combined in a set, i.e. YM, YC and MC; and finally a tertiary color in which all of the three principle colors are combined together, i.e. YMC.

A feature of the present invention is that a magnitude of each of the original color signals is classified into these primary, secondary and tertiary colors and then these designated colors are independently multiplied by a predetermined coefficient. On this point, however, in the conventional method, all colors of the original color signals are multiplied by the same coefficient as expressed in the equation 1. As a result, it has been impossible to perform a subtle adjustment of each individual hue by the conventional color correction circuit.

According to the present invention, it becomes possible to perform an adjustment for every hue of all colors independently because the original color signals are classified into three color components, or color designations such as a primary color portion, a secondary color portion and a tertiary color portion. A predetermined coefficient is then respectively multiplied to each of these classified color components.

According to the present invention, a primary color portion is a value obtained by subtracting a magnitude of a second largest signal level from a magnitude of the largest signal level that is obtained by comparing the magnitudes of the three principle colors; a secondary color portion is obtained by subtracting a magnitude of a third largest signal level from the magnitude of the second largest signal level; and a tertiary color portion is obtained by subtracting zero from the third largest signal level, equal to the smallest value of the original color signals.

SUMMARY OF THE INVENTION

It is therefore an object of the present invention to provide the color signal emphasizing/de-emphasizing method and apparatus capable of emphasizing or de-emphasizing any desired hue when producing an output of an image on a paper or a display based on the three principle colors obtained by scanning the target image in every pixel.

According to the present invention, a color signal emphasizing/de-emphasizing method comprises the steps of: classifying the original color signals obtained by scanning the target in every pixel according to the combination of the three principle color signals on the basis of the magnitude of each color into one of a plurality of hue areas; obtaining the magnitude of a primary color portion of each pixel according to the designated hue area; multiplying the three principle color signals obtained from all pixels by color coefficients predetermined respectively for the primary color portion and the remaining color portions thereof; summing up respective of the multiplied three principle color signals in every principle color.

Additionally, the remaining colors of the original color signals are further classified into a secondary color and a tertiary color, and a predetermined coefficient for each of these designated colors is multiplied by these classified colors separately, thereby each principle color of the original color signals are independently adjusted to a desired level.

Further in the present invention, there is provided an apparatus for emphasizing/de-emphasizing a color signal, the apparatus comprising: a hue area classification circuit for outputting a hue area classification signal according to the combination of the three principle color signals on the basis of the magnitude of each color; a primary color portion calculation circuit for outputting a magnitude of the primary color portion according to the designated hue area calculated by the original three color signals and the hue area classification signal applied thereto for each pixel; a color coefficient table capable of storing an arbitrary color coefficient for the primary color portion and the remaining color portions respectively; a primary color portion emphasizing/de-emphasizing circuit for sequentially multiplying the primary color portion of the original three color signals by the coefficient predetermined for the primary color portion read out from the color coefficient table; emphasizing/de-emphasizing circuits for the remaining color portions of the original three colors, the circuits sequentially multiplying the remaining color portions of the three original color signals by the color coefficients predetermined respectively for the remaining color portions read out from the coefficient table; at least one adder for summing up respective of the multiplied signals obtained from all of the emphasizing/de-emphasizing circuits for each principle color.

The primary color portion calculation circuit is further composed of a subtracter to deduct a color signal having a second largest signal level from that of the largest signal level according to a designated hue area; the secondary color portion calculation circuit further composed of a subtracter to deduct a color signal having a third largest signal level from that of the second largest signal level according to a designated hue area; the tertiary color portion calculation circuit further composed of a subtracter for subtracting zero from a signal having the third largest signal level.

Thus, according to the present invention, since the original color signals are subdivided into three elemental colors such as a primary, a secondary and a tertiary color portion according to the combination of the three principle color signals on the basis of the magnitude of each principle color. Further, there is provided the predetermined coefficients for respective of such elemental color signals. Thus, it is possible to change a hue of the original color signals in every principle color.

The above and other advantages, features and additional objects of this invention will be manifest to those versed in the art upon making reference to the following detailed description and the accompanying drawings in which a preferred structural embodiment of this invention is shown by way of illustrative example.

PREFERRED EMBODIMENT OF THE INVENTION

In the case of a thermal color printer, an emphasizing/de-emphasizing circuit of the present invention will now be described hereafter in connection with the accompanying drawings.

Figure 1:
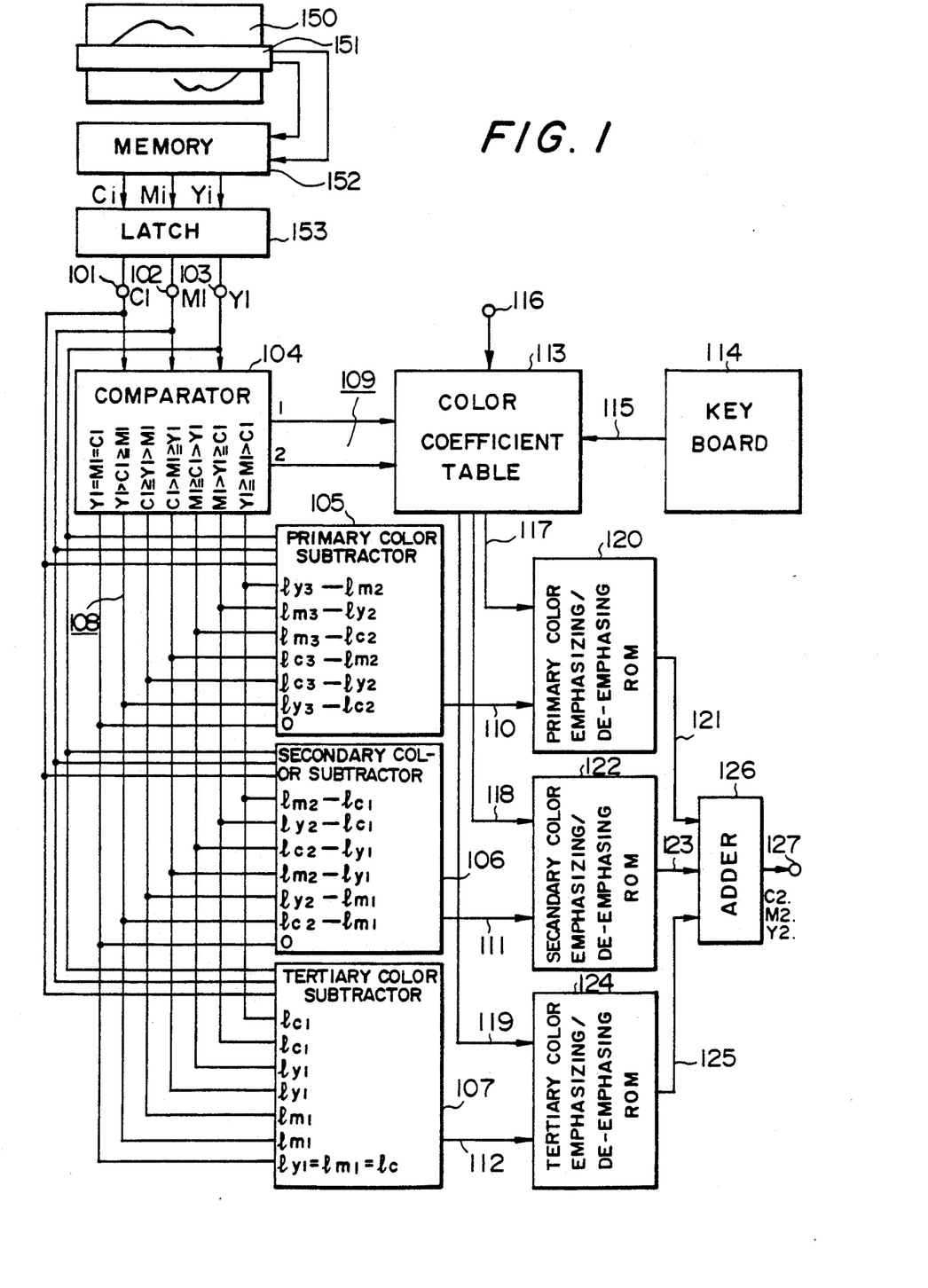
FIG. 1 is a block diagram showing a color signal emphasizing/de-emphasizing circuit embodying the present invention.

FIG. 1 is a block diagram showing a color signal emphasizing/de-emphasizing circuit embodying the present invention, equivalent to a matrix multiplier of the prior art shown in FIG. 6. In FIG. 1, the target image 150 is scanned as an electrical signal, by a known technique such as by use of a scanner 151, to be stored in a memory 152.

The image information scanned and stored at any desired time is read out as original color signals composed of Ci, Mi, Yi whenever it is necessary. This original color signal is delivered to a comparator 104 as input color signals C1, M1 and Y1 via input terminals 101, 102 and 103. Concurrently, the input color signals C1, M1, Y1 are input to a secondary color subtracter 106 and a tertiary color subtracter 107.

The comparator 104, as it will be explained in more detail in connection with FIG. 2 hereafter, classifies the input color signals C1, M1, Y1 into one of the hue classification areas, for example seven hue areas, according to the combination of the three principle color signals on the basis of the magnitude of each color to output a hue classification signal 108 in accordance with a hue area designated.

Besides, the comparator 104 produces an output of a principle color combination discrimination signal 109 identifying a primary color and a secondary color of the input color signals C1, M1, Y1.

A primary color subtracter 105 subtracts a second largest signal level from the largest signal value of the input color signals C1, M1, Y1 in accordance with the hue area classification signal 108 to produce an output of a primary color portion signal 110.

The secondary color subtracter 106 subtracts a third largest signal level from the second largest signal level of the input color signals C1, M1, Y1 in accordance with the hue area classification signal 108 to produce an output of a secondary color portion signal 111.

The tertiary color subtracter 107 subtracts zero from the third largest value of the input color signals C1, M1, Y1 to produce an output of tertiary color portion signal 112.

A color coefficient table 113 outputs a primary color portion emphasizing/de-emphasizing coefficient signal 117, a secondary color portion emphasizing/de-emphasizing coefficient signal 118, a tertiary color portion emphasizing/de-emphasizing coefficient signal 119 based on the input signals of the principle color combination discrimination signal 109, a color designation signal 115, an ink color signal input from an ink color signal input terminal 116.

A color designated is the color that a user wants to change, and an ink color represents a color of Y, M, C inks which are about to be printed when printing colors on a paper in sequence.

A primary color emphasizing/de-emphasizing ROM 120 outputs data stored in a memory addressed by a primary color portion emphasizing/de-emphasizing coefficient signal 117 and the primary color portion signal 110 as a primary color portion emphasized/de-emphasized signal 121.

A secondary color emphasizing/de-emphasizing ROM 122 outputs data stored in a memory addressed by a secondary color portion emphasizing/de-emphasizing coefficient signal 118 and the secondary color portion signal 111 as a secondary color portion emphasized/de-emphasized signal 123.

A tertiary color emphasizing/de-emphasizing ROM 124 outputs data stored in a memory addressed by a tertiary color portion emphasizing/de-emphasizing coefficient signal 119 and the tertiary color portion signal 112 as a tertiary color portion emphasized/de-emphasized signal 125.

An adder 126 adds the primary color portion emphasizing/de-emphasizing coefficient signal 121, the secondary color portion emphasizing/de-emphasizing coefficient signal 123 and the tertiary color portion emphasizing/de-emphasizing coefficient signal 125 to deliver the output color signals C2, M2, Y2 in time series from an output terminal 127.

Meanwhile, the emphasized/de-emphasized signals Co, Mo, Yo shown in FIG. 5 are output as the output color signals C2, M2, Y2.

Figure 2:
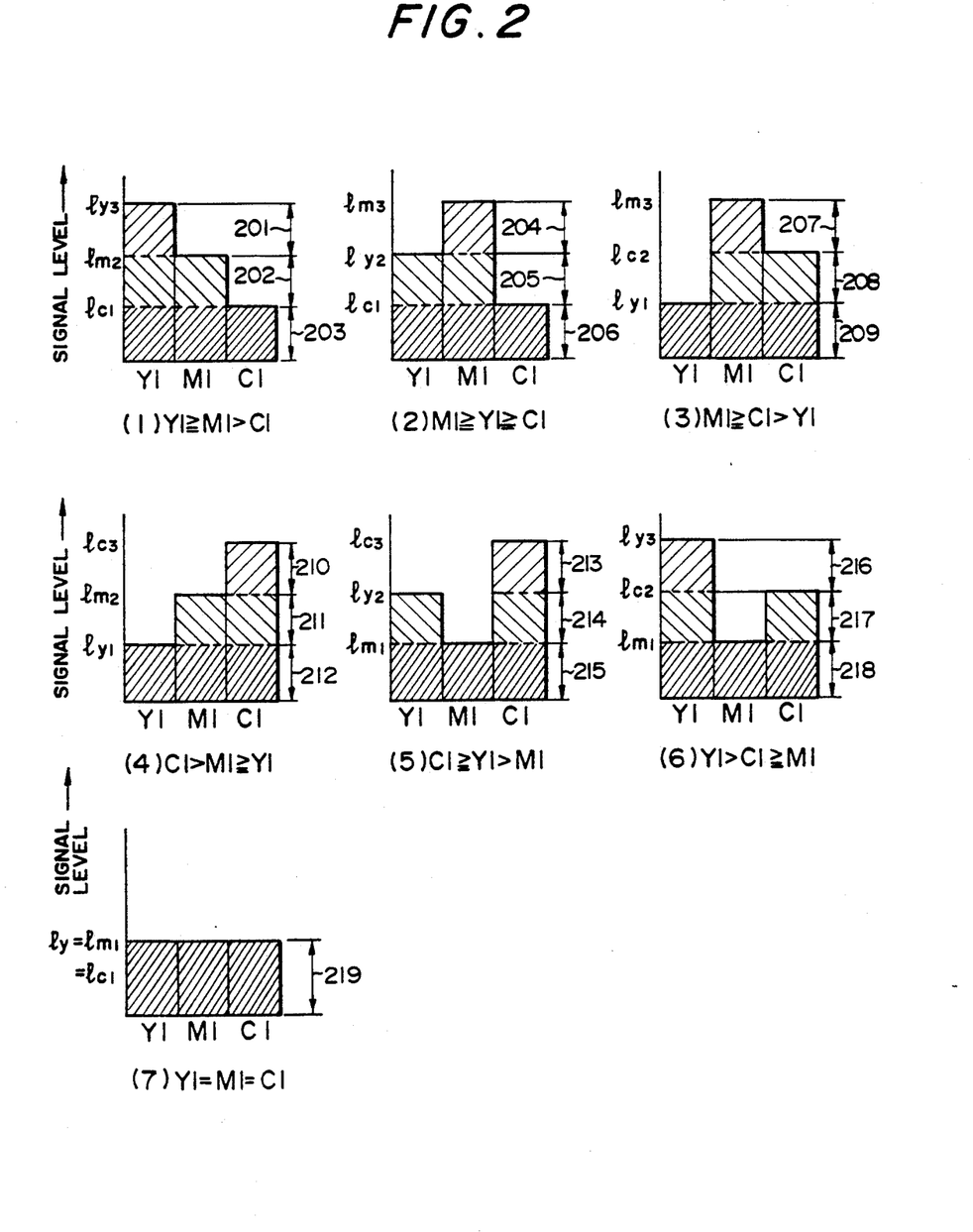
FIG. 2 is an explanatory view of a comparator of the preferred embodiment according to the present invention.

FIG. 2 shows typical combinations of the input color signals to which the input color signals C1, M1, Y1 are classified according to the combination of the three principle color signals on the basis of the magnitude of each color. In FIG. 2, the lateral axis represents the input color signals C1, M1, Y1 and the longitudinal axis, the magnitude of each input color signal.

Numerals 201, 204, 207, 210, 213 and 216 depict the primary color portion signal; numerals 202, 205, 208, 211, 214 and 217, the secondary color portion signal; and numerals 203, 206, 209, 212, 215, 218 and 219, the tertiary color portion.

Figure 3:
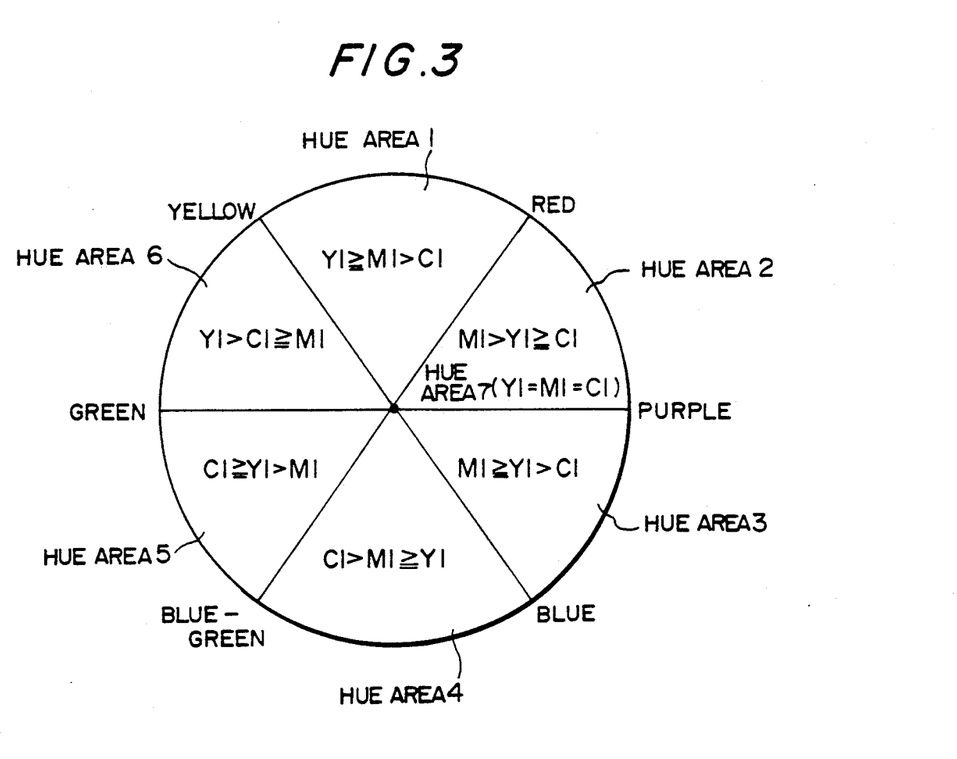
FIG. 3 is an explanatory view of a relation between a hue area to which input color signals are classified according to the combination of the three principle color signals on the basis of the magnitude of each color and a hue variation.

FIG. 3 is an explanatory view showing a relation between the seven hue classification areas designated by comparing the magnitudes of three input color signals and the hue variation. In the hue classification areas 1 through 6 designated according to the magnitude of each input color signal level, a circumference of the circle is subdivided into six hue areas.

For example, the area 1 covers the hue ranging from yellow to red; the area 2, the hue ranging from red to purple; the area 3, the hue ranging from purple to blue; the area 4, the hue ranging from blue to blue-green; the area 5, the hue ranging from blue-green to green; and the area 6, the hue ranging from green to yellow. In this circle, the area 7 covers only the tertiary color, that is the achromatic color (gray) and locates at the center of the circle.

Figure 4:
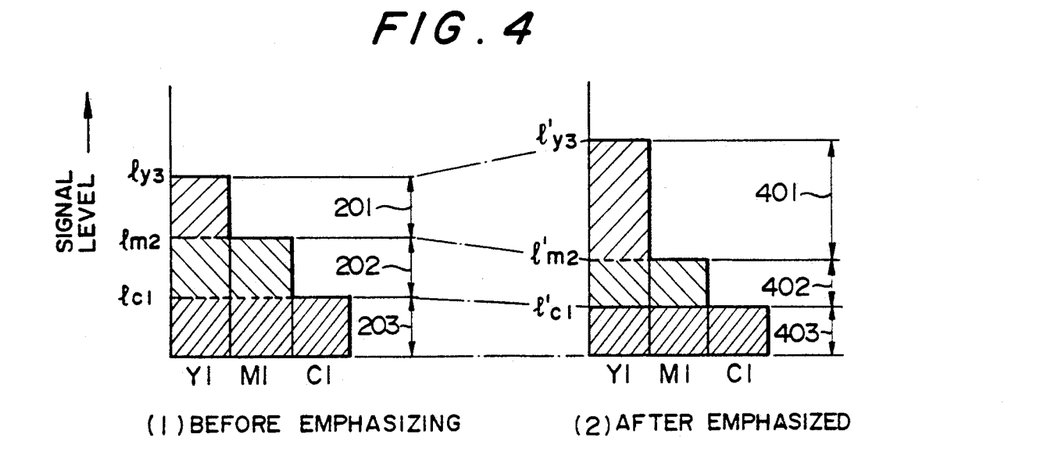
FIG. 4 is an explanatory view of the principle of the color signal emphasizing/de-emphasizing circuit embodying the present invention.

FIG. 4 is an explanatory view of the principle of the color signal emphasizing/de-emphasizing circuit embodying the present invention. In FIG. 4, numeral 1 depicts the signal level of the input color signals, or the input color signals C1, M1, Y1, before emphasized/de-emphasized; and numeral 2 depicts the signal level of the output color signals C2, M2, Y2.

Moreover in FIG. 4, numeral 401 depicts the primary color portion after being emphasized/de-emphasized; numeral 402, the secondary color portion after being emphasized/de-emphasized; and numeral 403, the tertiary color portion after being emphasized/de-emphasized.

The operation of the color signal emphasizing/de-emphasizing circuit as shown in FIG. 1 will now be explained more in detail. When the input color signals C1, M1, Y1 are respectively input to the input terminals 101, 102 and 103 according to the original color signals, the comparator 104 compares the magnitudes of these input color signals C1, M1, Y1 and classifies them into the hue classification areas shown in FIG. 2, outputting the hue area classification signal 108 showing which area these signals are classified into.

Concurrently, the comparator 104 produces an output of the principle color combination discrimination signal 109 to identify which color of the input color signals is the primary color and the secondary color.

In FIG. 2, since the primary color in the hue area 1 is the signal having the largest magnitude or the input color signal Y1, the signal identifying y is output as the principle color combination discrimination signal relative to the primary color in the hue area 1. In such a manner that the signal identifying M is output from the hue areas 2 and 3; the signal identifying C is output from the hue areas 4 and 5; and the signal identifying Y is output from the hue area 6. From the hue area 7, the principle color combination discrimination signal relative to the primary color is not output because no primary color exists in this area.

As to the secondary color, since there occurs a combination of the two principle colors in some portions of the input color signals between the signal having the largest magnitude and that of the second largest magnitude, the signal identifying YM is output as the principle color combination discrimination signal relative to the secondary color in the hue areas 1 and 2. In the same manner, the signal identifying MC is output from the hue areas 3 and 4, and the signal identifying YC is output from the hue areas 5 and 6. From the hue area 7, the principle color combination discrimination signal relative to the secondary color is not output because no secondary color exists in this area.

As described above, when the comparator 104 produces an output of the hue area classification signal 108, the primary color subtracter 105 subtracts a signal having the second largest magnitude from that of the largest magnitude in every hue classification area, outputting the signals 201, 204, 207, 10, 213 and 216 as the primary color portion signal 110. In the same way, the second subtracter 106 subtracts a signal having the third largest magnitude from that of the second largest magnitude in every hue classification area, outputting the signals 202, 205, 208, 211, 214 and 217 as the secondary color portion signal 111. The tertiary subtracter 107 subtracts zero from the signal having the third largest magnitude, or the principle color of the smallest magnitude, outputting the signals 203, 206, 209, 212, 215, 218 and 219 as the tertiary color portion signal. The functions of the comparator 104, the primary color subtracter 105, the secondary color subtracter 106 and the tertiary color subtracter 107 mentioned in the foregoing are illustrated in the table 1.

TABLE 1

| HUE AREA | Conditions | PRIMARY COLOR Color | PRIMARY COLOR Signal Level | SECONDARY COLOR Color | SECONDARY COLOR Signal Level | TERTIARY COLOR Color | TERTIARY COLOR Signal Level |
|---|---|---|---|---|---|---|---|
| 1 | $Y \geq M > C$ | Y | $Y_1 - M_1$ | YM (R) | $M_1 - C_1$ | | $C_1$ |
| 2 | $M > Y \geq C$ | M | $M_1 - Y_1$ | YM (R) | $Y_1 - C_1$ | | $C_1$ |
| 3 | $M \geq C > Y$ | M | $M_1 - C_1$ | MC (B) | $C_1 - Y_1$ | YMC (Gray) | $Y_1$ |
| 4 | $C > M \geq Y$ | C | $C_1 - M_1$ | MC (B) | $M_1 - Y_1$ | | $Y_1$ |
| 5 | $C \geq Y > M$ | C | $C_1 - Y_1$ | YC (G) | $Y_1 - M_1$ | | $M_1$ |
| 6 | $Y > C \geq M$ | Y | $Y_1 - C_1$ | YC (G) | $C_1 - M_1$ | | $M_1$ |
| 7 | $Y = M = C$ | — | — | — | — | | $Y_1 = M_1 = C_1$ |

When the comparator 104 classifies the input color signals C1, M1, Y1 into the hue classification areas 1 through 7 focusing on the magnitudes of the three principle colors in the original color signals, for example in the case of the hue area 1, $1y_3 - 1m_2$ is output as the primary color portion signal 110, the $1m_2 - 1c_1$ is output as the secondary color portion signal 111, and $1c_1$ is output as the tertiary color portion signal 112. Meanwhile, the comparator 104 produces at a color coefficient table 113 an output of the principle color combination discrimination signal 109 which shows the primary color and the secondary color of the input color signals are Y and YM respectively.

The color coefficient table 113 outputs a primary color portion coefficient signal 117, a secondary color portion coefficient signal 118 and a tertiary color portion coefficient 119, all of which satisfy the table 2, according to the principle color combination discrimination signal 109, the color designation signal 115 and the ink color signal input from the ink color signal input terminal 116.

TABLE 2

| COLOR COEFFICIENT | INK COLOR | Y | M | C |
|---|---|---|---|---|
| PRIMARY COLOR | Y | $k_{1Y}$ | 0 | 0 |
| | M | 0 | $k_{1M}$ | 0 |
| | C | 0 | 0 | $k_{1C}$ |
| SECONDARY COLOR | YM (R) | $k_{2YM}$ | $k_{2MY}$ | 0 |
| | YC (G) | $k_{2YC}$ | 0 | $k_{2CY}$ |
| | MC (B) | 0 | $k_{2MC}$ | $k_{2CM}$ |
| TERTIARY COLOR | YMC (Gray) | $k_{3Y}$ | $k_{3M}$ | $k_{3C}$ |

In the case of a Y ink, $k_{1Y}$ is output as the primary color portion coefficient signal. In this case, however, since Y is the only primary color, the coefficients for M and C are set to zero so as to not change the colors of M and C. In the same manner, $k_{2YM}$ is output as the secondary color portion coefficient signal in the case of the hue ares 1 and 2, and $k_{2YC}$ is output as the secondary color portion coefficient signal in the case of the hue areas 5 and 6. In the case of the hue areas 3 and 4, since Y as the secondary color does not exist, zero is output, and $k_{3Y}$ is output as the tertiary color portion coefficient signal.

When the signals of the primary color portion 110 and the primary color portion coefficient 117, the signals of the secondary color portion 111 and the secondary color portion coefficient 118, the signals of the tertiary color portion 112 and the tertiary color portion coefficient 119 are respectively input to a primary color portion emphasizing/de-emphasizing ROM 120, a secondary color portion emphasizing/de-emphasizing ROM 122, a tertiary color portion emphasizing/de-emphasizing ROM 124. The primary color portion emphasizing/de-emphasizing signal 121, the secondary color portion emphasizing/de-emphasizing signal 123 and the tertiary color portion emphasizing/de-emphasizing signal 125 are then output according to the emphasizing/de-emphasizing values, from which color saturation errors are eliminated, preliminarily stored on the basis of the information of the ink designated.

These emphasizing/de-emphasizing signals of the primary color portion, the secondary color portion and the tertiary color portion are now fully explained in connection with FIG. 4. In the case of the hue area 1, FIG. 4-1 shows the relation among the input color signals before emphasizing/de-emphasizing while FIG. 4-2 shows the relation among the signals after they are emphasized/de-emphasized. In FIG. 4, numerals 201, 202, 203 and 401, 402, 403 respectively shows the signal level of the primary color portion, the secondary color portion and the tertiary color portion. The relation of the signal levels can be given by the following equations;

$$l'_{y3} = k_{1Y}(l_{y3} - l_{m2}) + k_{2YM}(l_{m2} - l_{c1}) + k_{3Y}l_{c1} \quad (2)$$

$$l'_{m2} = k_{2MY}(l_{m2} - l_{c1}) + k_{3M}l_{c1} \quad (3)$$

$$l'_{c1} = k_{3C}l_{c1} \quad (4)$$

Since the results of these equations are preliminarily stored in the primary color portion emphasizing/de-emphasizing ROM 120, the secondary color portion emphasizing/de-emphasizing ROM 122 and the tertiary color portion emphasizing/de-emphasizing ROM 124 respectively, any coefficient is available for each color.

The primary color portion emphasizing/de-emphasizing signal 121, the secondary color portion emphasizing/de-emphasizing signal 123 and the tertiary color portion emphasizing/de emphasizing signal 125 are added together by the adder 126 to be output as an output color signal Y2, or an emphasized/de-emphasized color signal from the output terminal 27. As the next operation, the ink color signal showing the ink color M is input from the ink color signal input terminal 16 to the color coefficient table 113 in order to obtain the output color signal M2. A printing operation is completed after the output color signal C2 is obtained in the same manner described above.

Although in the above described embodiment, the input color signals are classified into the seven hue classification areas according to the combination of the three principle color signals on the basis of the magnitude of each color, the hue areas can be divided into other number of areas. Moreover, the emphasizing/de-emphasizing ROMs independently provided for the primary color portion, the secondary color portion, and the tertiary color portion can be replaced by a single or double ROMs if the address space permits. Further, black may be added to the input color signals composed of the three fundamental colors, Y, M and C. In addition, the tertiary color subtracter may be used replaced by a detector capable of detecting a signal having the minimum value in the original color signals.

As has been described above, according to the present invention, it is possible to reproduce an original color with high fidelity by such a low cost color signal emphasizing/de-emphasizing circuit composed of: a comparator for classifying an original color signal into a plurality of hue areas according to the combination of the three principle color signals on the basis of the magnitude of each color; a primary color portion subtractor for obtaining a primary color portion signal; a secondary color portion subtractor for obtaining a secondary color portion signal; a tertiary color portion subtractor for obtaining a tertiary color portion signal; a ROM for outputting an emphasized/de-emphasized signal from which color saturation errors of ink and the color designated to change are already eliminated; and an adder for summing up all output color signals delivered from the ROM.

What is claimed is:

1. A color signal emphasizing/de-emphasizing method for emphasizing/de-emphasizing an original color signal composed of three principle color signals which are obtained by scanning a target image by each of a plurality of pixels, the method comprising the steps of:

(a) classifying said original color signal obtained from each pixel into one of a plurality of hue classification areas according to the combination of said three principle color signals on the basis of the magnitude of each color;

(b) obtaining the magnitude of a primary color portion of each pixel according to said designated hue area;

(c) obtaining the magnitude of a secondary color portion of the each pixel according to said designated hue area;

(d) obtaining the magnitude of a tertiary color portion of each pixel according to said designated hue area;

(e) multiplying said primary color portion of said three principle color signals obtained from each of the plurality of pixels by a color coefficient predetermined for said primary color portion;

(f) multiplying said secondary color portion of said three principle color signals obtained from each of the plurality of pixels by a color coefficient predetermined for said secondary color portion;

(g) multiplying said tertiary color portion of said three principle color signals obtained from each of the plurality of pixels by a color coefficient predetermined for said tertiary color portion;

(h) adding up said multiplied color signals in every principle color.

2. A color signal emphasizing/de-emphasizing apparatus composed of a scanner for interpreting the target image over a plurality of pixels as an original color signal based on three principle color signals, a memory for storing the three principle color signals, an emphasizing/de-emphasizing circuit for reading out the stored signals in the form of color image information or data, and processing the read out signals with either emphasis or de-emphasis, the emphasizing/de-emphasizing circuit comprising:

(a) a hue area classification circuit for outputting a hue area classification signal according to a combination of the magnitude of said three principle color signals obtained by a comparison of the magnitude of each of said three principle color signals;

(b) a primary color portion calculation circuit for outputting a magnitude of a primary color portion according to said designated area on the basis of said three principle color signals and said the area classification signal applied thereto for each of the plurality of pixels, said primary color portion calculation circuit including a subtractor for deducting a color signal having a second largest signal level from a signal having the largest signal level, according to a designated hue area;

(c) a color coefficient table for storing an arbitrary color coefficient for said primary color portion and remaining color portions respectively;

(d) a primary color portion emphasizing/de-emphasizing circuit for sequentially multiplying said primary color portion of said three principle color signals by a coefficient predetermined for said primary color portion read out from said color coefficient table;

(e) emphasizing/de-emphasizing circuits for said remaining color portion of said three principle colors, said circuits for sequentially multiplying said remaining color portions of said three principle color signals by said color coefficients predetermined respectively for said remaining color portion read out from said coefficient table;

(f) at least one adder for adding up said multiplied signals in every principle color.

3. A color signal emphasizing/de-emphasizing circuit according to claim 2, wherein said hue area classification circuit outputs a principle color combination discrimination signal, that is a signal representing the component of each principle color signal, at said color coefficient table so that a color portion coefficient signal can be produced according to said principle color combination discrimination signal.

4. A color signal emphasizing/de-emphasizing circuit according to claim 2, said primary color portion emphasizing/de-emphasizing circuit further comprising a ROM for outputting an emphasized/de-emphasized color signal stored in a memory addressed by a predetermined coefficient and a predetermined magnitude of said primary color portion.

5. A color signal emphasizing/de-emphasizing apparatus composed of a scanner for interpreting a target image in each of a plurality of pixels as three principle color signals, a memory for storing the three principle color signals, an emphasizing/de-emphasizing circuit for reading out the stored signals in the form of color image information or data, and processing said read out signals with either emphasis or de-emphasis, the emphasizing/de-emphasizing circuit comprising:

(a) a hue area classification circuit for outputting a hue area classification signal according to a combination of the magnitude of said three principle color signals obtained a comparison of the magnitude of each of said three principle color signals;

(b) a primary color portion calculation circuit for outputting a magnitude of a primary color portion according to said designated hue area on the basis of said three principle color signals and said hue area classification applied thereto in each of the plurality of pixels;

(c) a secondary color portion calculation circuit for outputting a magnitude of a secondary color portion according to said designated hue area on the basis of said three principle color signals and said hue area classification signal applied thereto in each of the plurality of pixels;

(d) a tertiary color portion calculation circuit for outputting a magnitude of a tertiary color portion according to said designated hue area on the basis of said three primary color signals and said hue area classification signal applied thereto in each of the plurality of pixels;

(e) a color coefficient table capable of storing an arbitrary color coefficient for said primary color portion, said secondary color portion and said tertiary color portion respectively;

(f) a primary color portion emphasizing/de-emphasizing circuit for sequentially multiplying said primary color portion of said three principle color signals by a color coefficient predetermined for said primary color portion read out from said color coefficient table;

(g) a secondary color portion emphasizing/de-emphasizing circuit for sequentially multiplying said secondary color portion of said three principle color signals by a color coefficient predetermined for said secondary color portion read out from said color coefficient table;

(h) a tertiary color portion emphasizing/de-emphasizing circuit for sequentially multiplying said tertiary color portion of said three principle color signals by a color coefficient predetermined for said tertiary color portion read out from said color coefficient table; and (i) at least one adder for adding up respective of said multiplied signals in every principle color.

6. A color signal emphasizing/de-emphasizing circuit according to claim 5, wherein said hue area classification circuit outputs a principle color combination discrimination signal, that is a signal representing the component of each principle color signal, to said color coefficient table so that a color portion coefficient signal can be produced according to said principle color combination discrimination signal.

7. A color signal emphasizing/de-emphasizing circuit according to claim 5, wherein said primary color portion calculation circuit is composed of a subtractor for deducting a color signal having a second largest signal level from a signal having the largest signal level according to a designated hue area; said secondary color portion calculation circuit is composed of a subtractor for deducting a color signal having a third largest signal level from said signal of the second largest signal level according to a designated hue area; said tertiary color portion calculation circuit is composed of a subtractor for substracting zero from said signal of the third largest signal level.

8. A color signal emphasizing/de-emphasizing circuit according to claim 5, said primary color portion emphasizing/de-emphasizing circuit further comprising a ROM for outputting an emphasized/de-emphasized color signal stored in a memory addressed by a predetermined coefficient for said primary color portion and a predetermined magnitude of said primary color portion; said secondary color portion emphasizing/de-emphasizing circuit further comprising a ROM for outputting an emphasized/de-emphasized color signal stored in a memory addressed by a predetermined coefficient for a secondary color portion and a predetermined magnitude of said secondary color portion; said tertiary color portion emphasizing/de-emphasizing circuit further comprising a ROM for outputting an emphasized/de-emphasized color signal stored in a memory addressed by a predetermined coefficient for said tertiary color portion and a predetermined magnitude of said tertiary color portion.

* * * * *